April 1, 1952 R. R. GANNAWAY 2,591,249

TRANSFORMERLESS SAW-TOOTH CURRENT GENERATOR

Filed June 28, 1946 2 SHEETS—SHEET 1

INVENTOR.
Robertson R. Gannaway
BY
Mueller and Mason
Attorneys

INVENTOR.
Robertson R. Gannaway
BY
Mueller and Mason
Attorneys

Patented Apr. 1, 1952 2,591,249

UNITED STATES PATENT OFFICE 2,591,249

TRANSFORMERLESS SAW-TOOTH CURRENT GENERATOR

Robertson R. Gannaway, Oak Park, Ill., assignor to Belmont Radio Corporation, Chicago, Ill., a corporation of Illinois Application June 28, 1946, Serial No. 679,926

7 Claims. (Cl. 250—36)

This invention relates generally to apparatus for producing currents of sawtooth wave form and in particular to an efficient generator for producing sawtooth current in an inductive load as required for deflecting the scanning beam in television systems. Reference is made to the related invention of Robertson R. Gannaway and Stanley Zurakov, subject "Sawtooth Generator," Serial No. 667,305 filed May 4, 1946, now Patent No. 2,521,158 granted September 5, 1950.

In the design of an oscillator for producing a saw-tooth current in an inductive load, it is required that a constant voltage be provided for application across the load to allow the current to build up at a constant rate, and then cause the current to suddenly fall and build up again in a second wave of the same shape. In such a circuit it is desired that as little power be lost as possible, and to accomplish this, advantage must be taken of the energy stored in the inductive load when the current builds up therein. Also for use as a scanning current generator in a television receiver, the oscillator must be arranged to receive a synchronization pulse to cause the current to drop at a predetermined instant.

In prior systems, sawtooth currents have been produced in an inductive load by use of a regenerative amplifier in which a transformer coupling is provided between the plate and grid circuits of the amplifier tube. Such a system may be made to provide currents of the desired wave form but has the disadvantage that the transformer may actually dissipate much more energy than the load, thus constituting the major cause of inefficiency. Also, transformers as required for such systems are expensive, in many cases being more expensive than all of the other components required to make up the generator.

It is, therefore, an object of the present invention to provide an improved sawtooth oscillator or current generator which is of inexpensive construction and which utilizes standard components.

It is another object of this invention to provide a sawtooth current generator which does not include a transformer.

It is a further object of this invention to provide an efficient sawtooth current generator in which the dissipation of power by the generator itself is a minimum and in which the energy stored in the load when the current therein is a maximum is conserved so far as possible and is returned through the generator to the power source.

A feature of this invention is the provision of a sawtooth current generator which does not utilize a transformer and which is adapted to provide a constant output voltage across an inductive load for the required time to thereby produce a linearly rising current in the load.

An additional feature of this invention is the provision of a sawtooth current generator including an electron discharge valve having a regenerative coupling through a second electron discharge valve and a coupling through a rectifier which is effective during a portion of the cycle of said generator to prevent the regenerative action and to provide degenerative action.

A further feature of this invention is the provision of a scanning generator for a television receiver including an amplifier tube and a diode which cooperate to provide current for the deflecting coil of the receiver with the diode functioning to provide a degenerative action to cause stable operation of the oscillator during a portion of the cycle thereof and further being effective to conserve that portion of the energy, residing in the deflecting coil when the maximum current value is reached, which remains after the other portion of the cycle, during which the current rapidly falls and reverses.

A still further feature of this invention is the provision of a scanning generator for producing current of sawtooth wave form in the deflecting coil of a television receiver including an oscillator and an auxiliary amplifier tube for providing regenerative action in said oscillator to produce a retrace period, and to which synchronization pulses can be applied to initiate said retrace, pulses of small magnitude being capable of holding said oscillator in step due to the amplification thereof in said tube.

Further objects, features and advantages of this invention will be apparent from a consideration of the following description taken in connection with the accompanying drawings in which.

In practicing my invention I provide a sawtooth current generator including a thermionic amplifier tube which functions as an oscillator to provide a current of sawtooth wave form in an inductive load, such as the deflecting coil of a television receiver tube. A second thermionic amplifier tube is coupled to the plate and grid circuits of the oscillator in reversed polarity to form a loop which provides regenerative action essential for the maintenance of oscillations. A diode is also coupled to the plate and grid circuits of the oscillator,. and when it is conducting, effectively short circuits two points in the loop which are of opposite polarity. This provides degenerative action in the oscillator with a constant voltage being applied across the load, and the load being inductive, the current increases linearly therein providing the "trace" portion of the cycle. When a predetermined current is reached, the diode no longer conducts and regenerative action of the auxiliary tube is effective to cause a regenerative transient which blocks the oscillator and causes the current in the load to reverse providing the "retrace" oscillation. The reversed current in the load causes the diode to become conducting again and the stable equilibrium condition to be restored. The energy stored in the load at the time when the maximum current is reached is in part unavoidably lost during the retrace but the remainder is returned through the diode to the power supply during the first portion of the next cycle, while the current is rising from negative values toward zero. The oscillator may be held in step with synchronization pulses by applying these pulses to the auxiliary tube thereby causing the regenerative transient period to appear at the desired time rather than at the natural period of the generator.

Figure 1:
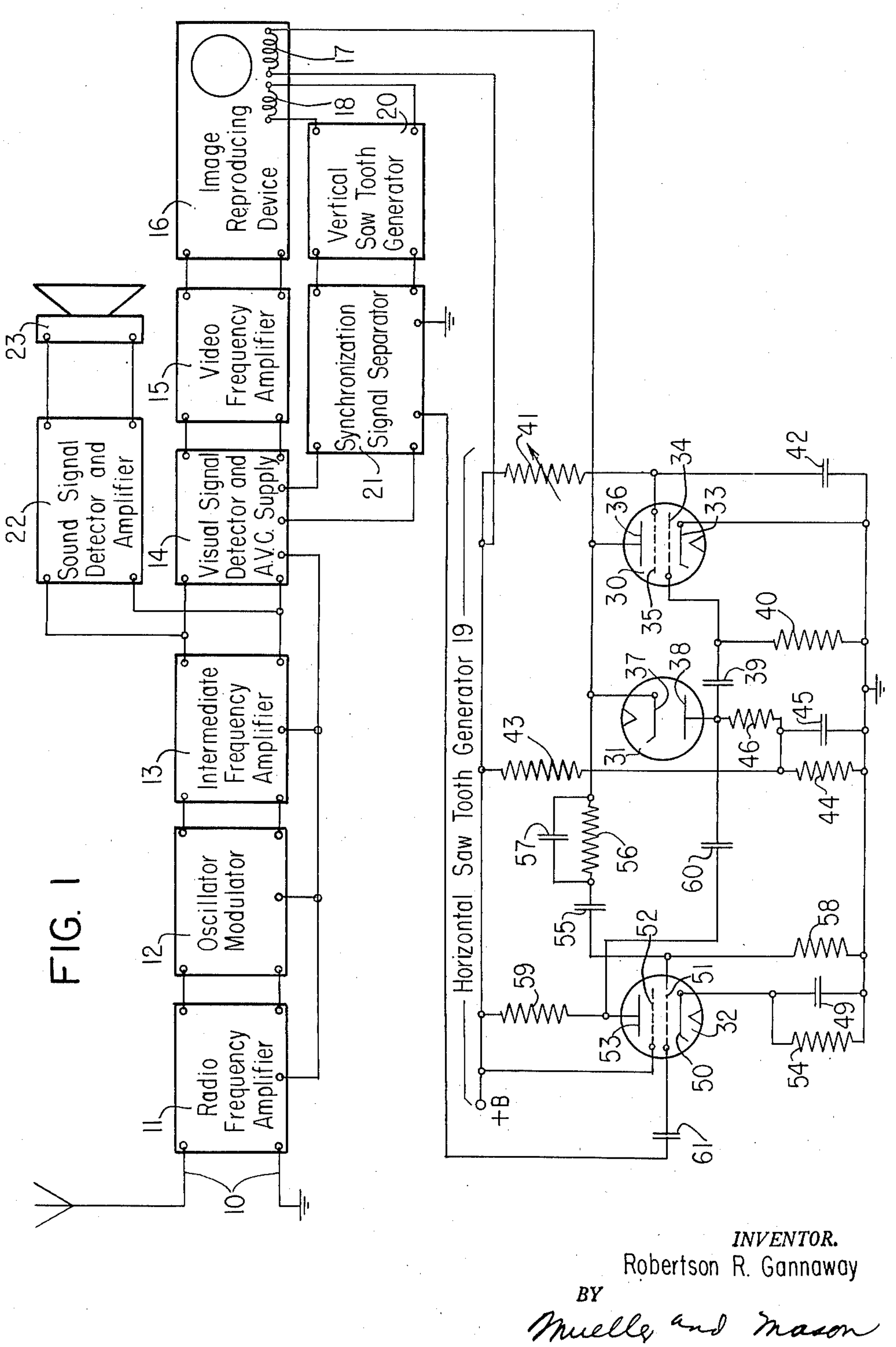
Fig. 1 is a schematical diagram of a television receiver utilizing the current generator of this invention.

Referring now to the drawings, in Fig. 1 there is illustrated a receiver of the superheterodyne type including an antenna system 10 connected to a radio frequency amplifier 11 to which are connected the following: an oscillator-modulator 12, an intermediate frequency amplifier 13, a visual-signal detector and automatic volume control supply 14, a video frequency amplifier 15 and an image reproducing device 16. The image reproducing device includes horizontal deflecting coils 17 and vertical deflecting coils 18 for causing the scanning beam of the image reproducing device to scan the screen in a predetermined manner. The deflecting coils are connected respectively to a horizontal sawtooth generator 19 and a vertical sawtooth generator 20 each of which has an input circuit coupled to the output circuit of detector 14 through the synchronizing signal separator 21. A sound signal detector and amplifier 22 and a sound reproducing device 23 are coupled to the output circuit of the intermediate frequency amplifier 13. An automatic volume control voltage is derived from detector 14 and applied to one or more of the tubes of radio frequency amplifier 11, oscillator-modulator 12 and intermediate frequency amplifier 13 to maintain the amplitude of the signal input to the detectors 14 and 22 within relatively narrow limits while receiving signals of widely varying amplitudes. All of the units described with the exception of the horizontal sawtooth generator 19 may be of well known construction and accordingly a detailed illustration and description thereof is not given herein. The horizontal sawtooth generator 19 and the operation thereof will be described in detail hereafter.

Referring now briefly to the operation of the television system illustrated in Fig. 1, radio frequency television signals are intercepted by the antenna 10 and the signals of the desired frequency are amplified in radio frequency amplifier 11 and translated to the oscillator-modulator 12 wherein they are converted into intermediate frequency signals which are in turn selectively amplified in the intermediate frequency amplifier and from which they are delivered to the visual signal detector 14 and the sound signal detector 22. The visual modulation components of the signal are derived by the detector 14 and are amplified by the video frequency amplifier 15 and furnished to a control electrode of the image reproducing device 16. The synchronization signals are also derived by the detector 14 and furnished to the synchronization signal separator from which separate vertical and horizontal synchronization pulses are furnished respectively to the vertical sawtooth generator and the horizontal sawtooth generator which supply currents for the deflecting coils 17 and 18 of the image reproducing device. The intensity of the scanning beam of the device 16 is modulated in accordance with the video frequency voltages impressed upon its control electrode in a well known manner. Deflecting currents are produced by the vertical sawtooth generator 20 and horizontal sawtooth generator 19 which are controlled by the synchronization voltages from the synchronization signal separator and are applied to the deflecting coils 17 and 18 to produce magnetic fields to deflect the scanning beam in two directions perpendicular to each other so as to trace a rectilinear scanning operation on the screen and thereby reconstruct the image which was transmitted. Sound modulated signals derived from the intermediate frequency amplifier 13 are detected and amplified in unit 22 and reproduced in the sound reproducing device 23.

The horizontal saw tooth generator 19 is illustrated in detail and includes a thermionic amplifier tube shown as a tetrode 30 coupled to a diode 31 and an auxiliary tetrode 32. The amplifier tube 30 includes a cathode 33, control grid 34, screen grid 35 and a plate 36. The diode 31 includes a cathode 37 which is connected to the plate 36 of the amplifier tube and a plate 38 which is coupled to the grid 34 of the amplifier tube through the capacitor 39. For the purpose of providing the proper bias on grid 34, the resistor 40 is provided. The screen grid 35 of the amplifier tube is connected to source of potential through a variable resistor 41 and is grounded for alternating currents through bypass condenser 42. The horizontal deflecting coil 17 of the image reproducing device is connected to the common connection between the plate 36 of the amplifier 30 and the cathode 37 of the diode 31 so that the currents through the amplifier tube and the diode are combined in the deflecting coil 17. A voltage divider network consisting of resistors 43 and 44 and condenser 45 are connected between +B and ground to provide a suitable constant potential to resistor 46.

The auxiliary amplifier tube 32 includes a cathode 50, a control grid 51, a screen grid 52 and a plate 53. The cathode 50 is connected through resistor 54 to ground and bypassed by condenser 49. The control grid 51 is connected to the plate 36 of the amplifier tube 30 through condenser 55 and resistor 56 in combination with capacitor 57, the function of which will be later described. The control grid is also grounded through biasing resistor 58. The screen grid 52 is connected directly to the source of potential +B and the plate 53 is connected through resistor 59 to this potential. The plate 53 is also coupled through condensers 60 and 39 to the amplifier tube 30.

Figures 2, 3, 4:
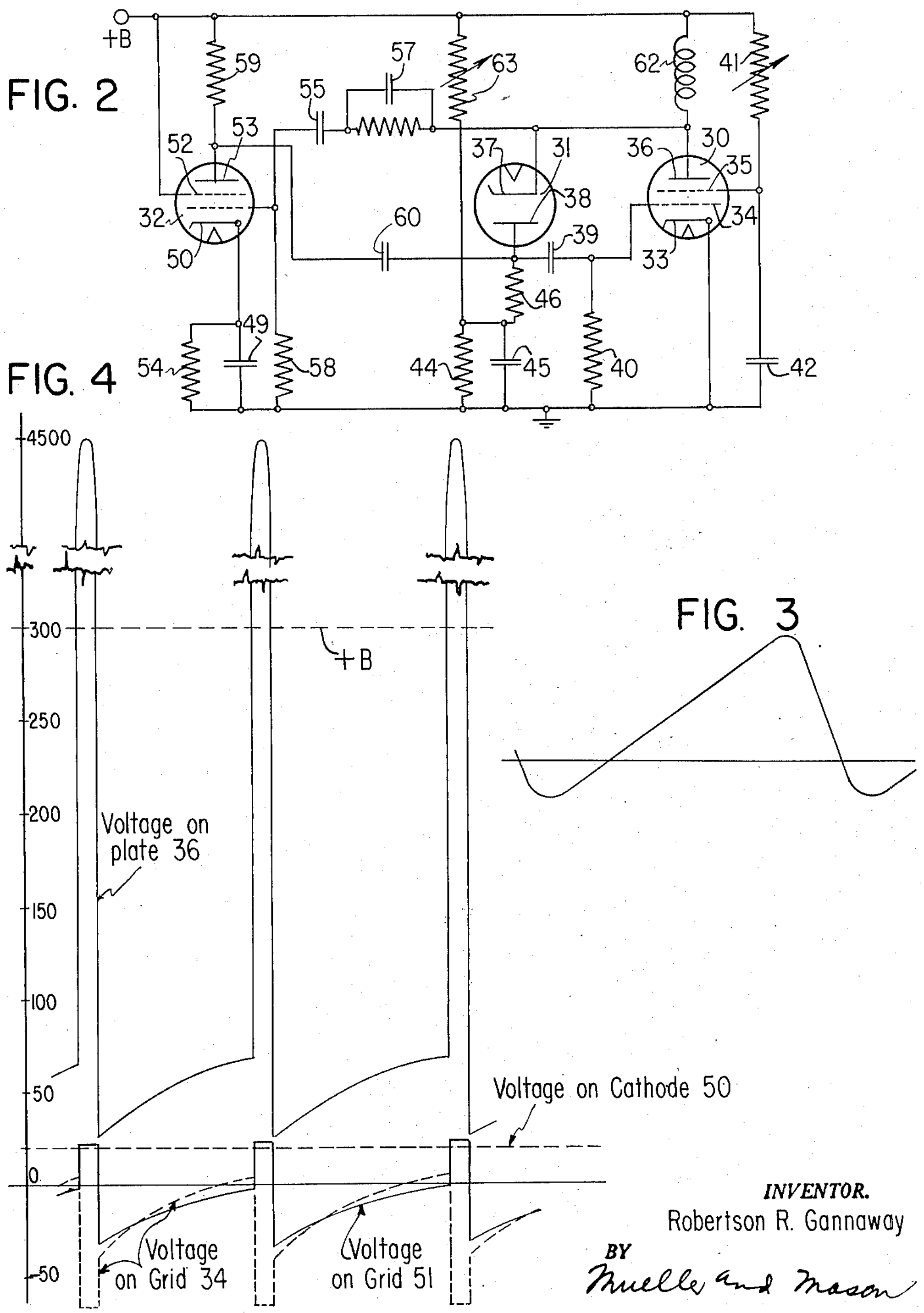
Fig. 2 is a circuit diagram of the generator similar to that shown in Fig. 1 but adapted for more general application.
Fig. 3 is a curve chart showing the wave form of the output current.
Fig. 4 is a chart showing the output voltage of the oscillator and the voltages appearing on the grids of the oscillator and auxiliary tubes.

Referring now to the operation of the generator, the tetrode 30 and the diode 31 are connected to the deflecting coil 17 in oposition so that the current in the deflecting coil will be the difference between the current in these tubes. At the beginning of the cycle, energy stored in the coil during the previous cycle will cause current to flow through the coil 17, the diode 31, the resistor 46, and condenser 45 in a direction to feed energy into the +B power supply. That is, current flows in opposition to the +B potential. This will be considered a negative direction of current flow through the coil. The current through the diode is greater than the current through the tetrode 30 at the beginning of the cycle so that the resulting current in the coil will be negative. The tetrode current may be substantially zero. The diode 31 provides a low resistance coupling between the grid 34 and the plate 36 of the tetrode 30 which provides degenerative action resulting in an equilibrium period during which a substantially constant voltage is applied across the deflecting coil 17. As the deflecting coil is an inductive load, the current through the coil will increase as long as this constant voltage is applied thereto. As the cycle proceeds, the diode current will gradually decrease and the current through resistor 46 will decrease, reducing the voltage across this resistor. As the resistor 46 is coupled to the control grid 34 of the amplifier tube 30 through condenser 39, the reduced voltage across the resistor 46 will decrease the negative potential on the grid 34 causing an increase in plate current flow through the tube 30. The increasing plate current combines with the decreasing current in the diode 31 to provide an increase in current through the load. The current through the tetrode in time becomes equal to the current through the diode, at which time the current in the deflecting coil reaches zero in its linear rise from negative to positive values (Fig. 3). From this point on, since the current is flowing in conformity with the +B potentials, energy flows from the power supply into the deflecting coil. As the current through the coil increases further, the current in the diode continuously decreases and eventually becomes zero removing the low resistance coupling on the tetrodes 30 and 32. As the current through the resistor 46 cannot further decrease when the diode is not conducting, the potential of the control grid 34 will accordingly cease rising, and with it the current in the tetrode 30. There being no longer any increase in current in the deflecting coil, the potential across it drops; that is, the potential at the plate 36 rises toward +B. As the grid 51 of the auxiliary tube 32 is coupled to the plate 36 of the tetrode 30, the increasing potential on the plate 36 is applied to the grid 51 through condensers 55 and 57 and resistor 56 and amplified in the tube 32 causing a decrease of potential on the plate 53 of the auxiliary tube, which is applied through capacitors 60 and 39 to the control grid 34 of amplifier tube 30, causing the plate current of amplifier tube 30 to drop. The current in the deflecting coil is thus forced to drop. This requires that the potential across it be reversed; that is, the potential of plate 36 rises above +B. This causes the grid 51 to be driven further positive with further decrease of potential at the plate 53 and further decrease of plate current of the tetrode 30. (Resistor 56 has a high resistance to somewhat limit the effect of the increasing potential of plate 36 on the grid 51. Condenser 57 prevents high-frequency attenuation which would otherwise be caused by the high value of resistor 56.) The regenerative process continues rapidly with the plate current of tube 30 being almost instantaneously cut off.

The current in the deflecting coil, however, does not drop instantaneously. Instead, the energy stored magnetically therein flows into the effective capacitance of the coil and the stray circuit capacitance, where it is for the moment stored electrically, then flows back to the coil inductance, again being stored magnetically. This process takes a definite time and is in all respects simply one half cycle of free sinusoidal oscillation of the LC circuit constituted by the coil inductance and the total circuit capacitance. This half cycle starts with the current maximum, the potential essentially zero. As it progresses, the current falls to zero and reverses; the potential rises to an extremely high value and in such direction as to decrease the current, then falls to zero again. This is the retrace oscillation. During the retrace oscillation, a considerable portion of the initially available energy is lost through winding resistance, insulation leakage, etc. Since these factors are in the nature of defects in components, this energy loss must be considered unavoidable. As the retrace oscillation ends, the potential of the plate 36 and the cathode 37 drops to a low value so that the diode again becomes conducting restoring the equilibrium condition of the amplifier tube 30. The energy still remaining is stored in the deflecting coil by virtue of the reversed current flowing therein. This current flows through the coil, diode, resistor 46, and condenser 45 in a direction to feed energy to the +B power supply thereby conserving this energy. The diode 31 then again forms a low resistance coupling between the grid and plate of the amplifier tube 30 to cause an equilibrium condition during which the current builds up in the deflecting coil 17.

The diode also prevents regenerative action by the auxiliary tube during the equilibrium period. As is shown in Fig. 4, the grid 51 of the auxiliary tube 32 is driven slightly more positive than the cathode 50 during the retrace. Resistor 56 prevents an excessive positive potential on grid 51 from being produced by the extremely high voltage developed at plate 36. The capacitor 55 becomes charged by current flowing between grid 51 and cathode 50 during the retrace period and when the voltage of the plate 36 of the tetrode 30 returns to the substantially constant potential existing during the equilibrium period, the potential of the capacitor 55 holds the grid 51 at a voltage which is below the cut-off of the tube 32 causing the tube to be blocked. This function of capacitor 55 is incidental, the essential purpose being to prevent the coupling of +B voltage from plate 36 to grid 51 through resistor 56. The values of the capacitor 55 and resistor 58 are such that this blocking is ended during the equilibrium period. The potential across the capacitor leaks to ground through resistor 58 causing the potential of the grid 51 to increase and the tube 32 to become conducting. The tube must become conducting before the diode 31 is blocked so that as soon as the diode is blocked the regenerative action will immediately take effect.

When the television receiver is operating, the horizontal synchronization pulses are separated in the unit 21 and amplified and applied to the horizontal sawtooth generator through condenser 61 to the grid 51 of the auxiliary tube 32. The pulses will be amplified in the tube 32 and applied to the grid 34 of the oscillator. The amplification of the pulses permits the use of synchronization pulses of very small amplitude to hold the oscillator in step therewith. As normally used in a television system the natural or free running period of the oscillator must be slightly longer than the interval between synchronization pulses so that the synchronization pulses will be applied to the auxiliary tube 32 just before the diode 31 is blocked, thus initiating the regenerative transient or retrace slightly ahead of the time when it would occur naturally. The natural period of the oscillator can be controlled by the variable resistor 41 as will be later explained. The operation of the oscillator upon receiving the synchronization pulse is identical to that previously described.

In Fig. 2 there is illustrated a current generator similar to the generator of Fig. 1 but of such construction that it will be of more general application. The principal components are identical to the corresponding components of the generator 19 and accordingly the same reference characters are used as in Fig. 1. Instead of being illustrated in a television system, the generator is shown connected to a load 62 which may be any inductive load desired. The resistor 43 of Fig. 1 is replaced by a variable resistor 63 so that the voltage applied to resistor 46 may be changed. By changing this voltage the voltage applied to the load 62 is changed causing the current to build up in the load at a different rate. That is, if the voltage across the load is increased the current will build up faster and if the voltage is decreased the current will build up at a slower rate. The maximum current in the load will not be changed, however, as this is governed by the current capacity of the tetrode 30. Accordingly, the variable resistor 63 provides control of the natural frequency with an incidental change in slope of the current wave, the maximum current values being substantially constant.

By adjustment of the variable resistor 41, the potential at the screen grid 35 of the tetrode 30 may be varied. This results in a variation in the current capability of the tetrode, thereby permitting the current wave to rise at the same rate but to a different value. For example, an increase of screen voltage increases the current capability of tetrode 30 thereby causing an increase in the time required to exhaust this capability and thus decrease the natural frequency of the generator. The variable resistor 41, therefore, provides control of the natural frequency with an incidental variation in the maximum value of the output current, the slope being substantially constant.

In some applications, particularly in a television receiver, the sawtooth current generator operates under a condition of synchronization. Although a frequency control may be necessary to insure that synchronization is effected, it does not actually change the frequency when it is varied through the limited range for which the generator remains in synchronism. Control by means of resistor 63 will, however, vary the output voltage and hence the slope of the output current. The frequency being fixed when the oscillator is synchronized, this produces a change in total current amplitude. In contrast, if the resistor 41 is used as a frequency or synchronization control, the output voltage is not affected nor is the slope of the output current wave. For this reason, in most applications where synchronized operation is desired, the latter type of control is preferred and a variable resistor 63 is not required.

The circuit constants of an oscillator which was built and operated satisfactorily are as follows:

| | |
|---|---|
| Tetrode 30 | 7C5 tube |
| Diode 31 | 6AL5 tube |
| Tetrode 32 | 6V6 tube |
| Capacitor 39 | .1 microfarad |
| Resistor 40 | 33,000 ohms |
| Resistor 41 | Variable |
| Capacitor 42 | .1 microfarad |
| Resistor 43 | 10,000 ohms |
| Resistor 44 | 33,000 ohms |
| Capacitor 45 | .1 microfarad |
| Resistor 46 | 900 ohms |
| Capacitor 49 | 10 microfarads |
| Resistor 54 | 15,000 ohms |
| Capacitor 55 | 50 micromicrofarads |
| Resistor 56 | 2.2 megohms |
| Capacitor 57 | 2 micromicrofarads |
| Resistor 58 | 220,000 ohms |
| Resistor 59 | 10,000 ohms |
| Capacitor 61 | 10 micromicrofarads |
| Coil 17 | 68 millihenries |
| +B voltage | 300 volts |

Resistor 41 is adjusted to set the screen voltage for the proper current capability of the tetrode being used. The resistor 46 must be of a value such that the diode will conduct all the negative current from the coil back to the power supply but so that the diode current is still not excessive. Excess diode current merely flows through the tetrode 30 to ground. The plate current in tetrode 30 should be substantially zero at the beginning of the equilibrium period.

From the above it is seen that there is provided an efficient and inexpensive generator for producing sawtooth currents, which is of suitable design for use in providing scanning current for the deflecting coils of a cathode ray tube. The elimination of the transformer which is usually required in such a generator reduces the cost of the generator by a substantial amount, reduces the weight and space required for the generator, and further eliminates the energy loss which normally occurs in the windings of the transformer. The generator provides stable operation and includes means for conserving energy which is normally wasted when the current in the load changes. The circuit is comparatively simple and utilizes standard components.

Although I have described what is considered the preferred embodiment of my invention, it is obvious that various modifications and changes can be made therein which fall within the intended scope of the invention as defined by the appended claims.

I claim:

1. A generator for producing current of sawtooth wave form in an inductive load comprising a first electron discharge valve having a plate, a control grid, and a screen grid, means for applying a voltage to said screen grid, a second electron discharge valve having an input electrode coupled to said plate of said first electron discharge valve and an output electrode coupled to said control grid of said first electron discharge valve to provide regenerative action therebetween, a rectifier coupled to said first electron discharge valve to provide a low resistance degenerative coupling between said plate and said control grid thereof when said rectifier is conducting, the current through said first electron discharge valve and the current through said rectifier combining to provide increasing current in said load until the maximum current capacity of said first electron discharge valve is reached when said regenerative action of said second electron discharge valve causes said current to fall, the amount of voltage applied to said screen grid controlling the maximum current capacity of said first electron discharge valve to thereby control the maximum load current and the natural period of said generator.

2. A generator for producing current of sawtooth wave form in an inductive load comprising a first thermionic amplifier tube having a plate, a control grid, and a screen grid, means for applying a voltage to said screen grid, a second thermionic tube having input and output electrodes, with said input electrode being coupled to said plate of said first thermionic tube and said output electrode coupled to said control grid of said first thermionic tube to provide regenerative action therebetween, a diode coupled to said amplifier tube to provide a low resistance degenerative coupling between said plate and said control grid thereof when said diode is conducting, the current through said amplifier tube and the current through said diode combining to provide increasing current in said load until a predetermined current is reached when said diode is blocked and the maximum current capacity of said amplifier tube is reached causing said amplifier tube to be blocked and the load current to fall, and means for varying the amount of voltage applied to said screen grid to change the current capacity of said amplifier tube and thereby change the magnitude of said load current and the natural period of said generator.

3. A generator for producing a current of sawtooth wave form comprising first and second electron discharge valves each having a plate and a grid, a rectifier having a plate and a cathode, a source of potential, an inductive output circuit having a first terminal connected to said source of potential and a second terminal connected to said plate of said first electron discharge valve and to said cathode of said rectifier, means coupling said plate of said rectifier to said grid of said first electron discharge valve, resistance means coupling said plate of said rectifier to said source of potential, and a regenerative feedback circuit including said second electron discharge valve coupled to said plate and said grid of said first electron discharge valve to produce oscillations therein, said feedback circuit including means coupling said plate of said first electron discharge valve to said grid of said second electron discharge valve and means coupling said plate of said second electron discharge valve to said grid of said first electron discharge valve, said rectifier providing a low impedance degenerative coupling between said plate and said grid of said first electron discharge valve so that the potential of said plate remains substantially constant and a linearly increasing current is provided in said output circuit, the current through said rectifier decreasing as said current in said output circuit increases, with said rectifier being blocked when a predetermined output current is reached to remove said low impedance coupling and allow regenerative action through said feedback circuit.

4. A generator for producing a current of sawtooth wave form comprising first and second electron discharge valves each having a plate and a grid, a rectifier having a plate and a cathode, a source of potential, an inductive output circuit connected to said source of potential and to said plate of said first electron discharge valve and said cathode of said rectifier whereby the current through said first electron discharge valve and the current through said rectifier combine to provide the current through said output circuit, means coupling said plate of said rectifier to said grid of said first electron discharge valve, resistance means connecting said plate of said rectifier to said source of potential, and a regenerative feedback circuit including means coupling said grid and said plate of said second electron discharge valve to said plate and said grid of said first electron discharge valve respectively to produce oscillations therein, said rectifier providing a low impedance degenerative coupling between said plate and said grid of said first electron discharge valve so that the voltage across said output circuit is substantially constant and a linearly increasing current is produced therein, the current through said rectifier decreasing as said current in said output circuit increases, with said rectifier being blocked when a predetermined output current is reached to remove said low impedance coupling and allow regenerative action through said feedback circuit.

5. A generator for producing current of sawtooth wave form comprising first and second electron discharge valves, each of said electron discharge valves having at least a plate and a grid, a source of potential, an inductive output circuit connected between said source of potential and said plate of said first electron discharge valve, means coupling said plate of said second electron discharge valve to said grid of said first electron discharge valve and coupling said grid of said second electron discharge valve to said plate of said first electron discharge valve to provide regenerative action in said first electron discharge valve, a rectifier including a plate and a cathode, said cathode of said rectifier being connected to said plate of said first electron discharge valve and said plate of said rectifier being coupled to said grid of said first electron discharge valve, and means connecting said plate of said rectifier to said source of potential, said rectifier providing a low impedance coupling between said plate and said grid of each of said electron discharge valves to provide degenerative action in said first electron discharge valve and to render said second electron discharge valve ineffective, said degenerative action providing a substantially constant potential across said output circuit with the current therein building up linearly until a predetermined value is reached at which time the potential on said plate of said first electron discharge valve and on said cathode of said rectifier increases, said increased potential on said cathode rendering said rectifier nonconducting to remove said low impedance coupling, said regenerative action providing a transient oscillation in said output circuit when said low impedance coupling is removed.

6. A generator for producing current of sawtooth wave form comprising a first electron discharge valve having a plate, a screen grid and a control grid, a second electron discharge valve having a plate and a grid, a source of potential, an inductive output circuit connected between said source of potential and said plate of said first electron discharge valve, resistance means connectiong said screen grid of said first electron discharge valve to said source of potential, means coupling said plate of said second electron discharge valve to said control grid of said first electron discharge valve and coupling said control grid of said second electron discharge valve to said plate of said first electron discharge valve to provide regenerative action in said first electron discharge valve, a rectifier including a plate and a cathode, said cathode of said rectifier being connected to said plate of said first electron discharge valve and said plate of said rectifier being coupled to said control grid of said first electron discharge valve, and additional resistance means connecting said plate of said rectifier to said source of potential, said rectifier providing a low impedance coupling between said plate and said control grid of each of said electron discharge valves to provide degenerative action in said first electron discharge valve and to render said second electron discharge valve ineffective, said degenerative action providing a substantially constant potential across said output circuit with the current therein building up linearly until a predetermined value is reached at which time the potential on said plate of said first electron discharge valve increases and said rectifier is blocked removing said low impedance coupling, said regenerative action providing a transient oscillation in said output circuit when said low impedance coupling is removed.

7. A generator for producing current of sawtooth wave form comprising a first electron discharge valve, having a plate, a screen grid and a control grid, a second electron discharge valve having a plate and a grid, a source of potential, an inductive output circuit connected between said source of potential and said plate of said first electron discharge valve, variable resistance means connecting said screen grid of said first electron discharge valve to said source of potential, means coupling said plate of said second electron discharge valve to said control grid of said first electron discharge valve and said control grid of said second electron discharge valve to said plate of said first electron discharge valve to provide regenerative action in said first electron discharge valve, a rectifier including a plate and a cathode, said cathode of said rectifier being connected to said plate of said first electron discharge valve and said plate of said rectifier being coupled to said control grid of said first electron discharge valve, and means connecting said plate of said rectifier to said source of potential, said rectifier providing a low impedance coupling between said plate and said control grid of each of said electron discharge valves to provide degenerative action in said first electron discharge valve and to render said second electron discharge valve ineffective, said degenerative action providing a substantially constant potential across said output circuit with the current therein building up linearly until the current capacity of said first electron discharge valve is reached at which time the potential on said plate of said first electron discharge valve increases and said rectifier is blocked removing said low impedance coupling, said variable resistance means being adjustable to control the current capacity of said first valve, said regenerative action providing a transient oscillation in said output circuit when said low impedance coupling is removed.

ROBERTSON R. GANNAWAY.

REFERENCES CITED

The following references are of record in the file of this patent:

UNITED STATES PATENTS

| Number | Name | Date |
|---|---|---|
| 2,173,427 | Scott | Sept. 19, 1939 |
| 2,207,511 | Grieger | July 9, 1940 |
| 2,248,975 | Faudell | July 15, 1941 |
| 2,300,524 | Roberts | Nov. 3, 1942 |
| 2,309,672 | Schade | Feb. 2, 1943 |
| 2,410,920 | Atwood, Jr. | Nov. 12, 1946 |
| 2,423,931 | Etter | July 15, 1947 |
| 2,436,447 | Packard | Feb. 24, 1948 |